(12) United States Patent
Coapes et al.

(10) Patent No.: US 8,959,957 B2
(45) Date of Patent: Feb. 24, 2015

(54) MANUFACTURE OF SYNTHETIC SILICA GLASS

(75) Inventors: Richard Benjamin Coapes, Whitley Bay (GB); Alan Mundy, Ponteland (GB); Ian George Sayce, Stocksfield (GB)

(73) Assignee: Heraeus Quartz UK Limited, Tyne and Wear (GB)

( * ) Notice: Subject to any disclaimer, the term of this patent is extended or adjusted under 35 U.S.C. 154(b) by 188 days.

(21) Appl. No.: 13/581,974

(22) PCT Filed: Feb. 28, 2011

(86) PCT No.: PCT/EP2011/052923
§ 371 (c)(1),
(2), (4) Date: Nov. 2, 2012

(87) PCT Pub. No.: WO2011/107430
PCT Pub. Date: Sep. 9, 2011

(65) Prior Publication Data
US 2013/0045854 A1    Feb. 21, 2013

(30) Foreign Application Priority Data
Mar. 2, 2010   (GB) .................................. 1003468.4

(51) Int. Cl.
*C03B 37/018* (2006.01)
*C03B 19/14* (2006.01)

(52) U.S. Cl.
CPC ......... *C03B 19/1415* (2013.01); *C03B 2201/10* (2013.01); *C03B 2201/28* (2013.01); *C03B 2201/30* (2013.01); *C03B 2201/34* (2013.01); *C03B 2207/34* (2013.01)
USPC .................. 65/414; 65/415; 65/416

(58) Field of Classification Search
USPC ........................................... 65/414, 415, 416
See application file for complete search history.

(56) References Cited

U.S. PATENT DOCUMENTS

| | | | |
|---|---|---|---|
| 2,272,342 A | | 2/1942 | Hyde |
| 3,883,336 A | * | 5/1975 | Randall .......................... 65/17.4 |
| 4,440,558 A | * | 4/1984 | Nath et al. ..................... 65/391 |
| 5,043,002 A | | 8/1991 | Dobbins |

(Continued)

FOREIGN PATENT DOCUMENTS

| | | |
|---|---|---|
| EP | 0463045 | 1/1991 |
| EP | 0868401 | 12/1995 |

(Continued)

OTHER PUBLICATIONS

International Search Report for International Patent Application No. PCT/EP2011/052923 issued Jun. 6, 2011.

(Continued)

*Primary Examiner* — Noah Wiese
(74) *Attorney, Agent, or Firm* — Howson & Howson LLP

(57) ABSTRACT

Methods are described for manufacturing silica-based glass, in which silica precursor material is supplied to a synthesis flame in the form of an emulsion. The methods involve the steps of: forming an emulsion of an aqueous phase in a non-aqueous liquid silica precursor material; supplying the emulsion as a spray of droplets into a synthesis flame, whereby the precursor material is converted in the flame into a silica-containing soot; and collecting the soot on a substrate, either as a porous soot body for subsequent consolidation to glass or directly as a substantially pore-free glass.

23 Claims, 2 Drawing Sheets

(56) References Cited

U.S. PATENT DOCUMENTS

| | | |
|---|---|---|
| 5,110,335 A | 5/1992 | Miller |
| 5,443,607 A | 8/1995 | Englisch |
| 5,713,979 A | 2/1998 | Nicholson |
| 5,735,928 A | 4/1998 | Sayce |
| 5,790,315 A | 8/1998 | Fujinoki |
| 5,984,997 A | 11/1999 | Bickmore |
| 5,985,779 A | 11/1999 | Sayce |
| 6,260,385 B1 | 7/2001 | Sempolinski |
| 6,374,642 B1 | 4/2002 | Blackwell |
| 6,546,757 B1 | 4/2003 | Morse |
| 6,588,230 B1 | 7/2003 | Misra et al. |
| 6,705,127 B1 * | 3/2004 | Cain et al. ............. 65/421 |
| 6,739,156 B1 | 5/2004 | Hawtof |
| 6,763,682 B1 | 7/2004 | Sayce |
| 6,837,076 B2 | 1/2005 | Hawtof |
| RE39,535 E | 4/2007 | Dobbins |
| 7,624,596 B2 | 12/2009 | Janka |
| 2006/0001952 A1 | 1/2006 | Janka |
| 2006/0165898 A1 | 7/2006 | Kodas |
| 2006/0165910 A1 | 7/2006 | Kodas |
| 2006/0166057 A1 * | 7/2006 | Kodas et al. ............. 429/22 |
| 2008/0039310 A1 | 2/2008 | Hayashi |
| 2008/0069945 A1 | 3/2008 | Horne |
| 2009/0104454 A1 | 4/2009 | Sayce |
| 2009/0233105 A1 | 9/2009 | Remington |
| 2010/0055340 A1 | 3/2010 | Park |

FOREIGN PATENT DOCUMENTS

| | | |
|---|---|---|
| EP | 0709487 | 5/1996 |
| JP | 54-142317 | 11/1979 |
| JP | 55-095638 | 9/1980 |
| JP | 56-14438 | 2/1981 |
| JP | 6080415 | 3/1994 |
| JP | 60-96591 | 4/1994 |
| KR | 758019 | 9/2007 |
| WO | WO 2006/078825 | 4/2007 |
| WO | WO 2009/134305 | 11/2009 |

OTHER PUBLICATIONS

Fuchihata et al, Observation of Microexplosion in Light Oil-Water Emulsion Spray Flame, Kinki University, Osaka, Japan, obtained from http://www.galcit.caltech.edu/~jeshep/icders/cd-rom/EXTABS/89_20TH.PDF.

* cited by examiner

US 8,959,957 B2

MANUFACTURE OF SYNTHETIC SILICA GLASS

CROSS-REFERENCE TO RELATED APPLICATIONS

This application is a national stage of International Patent Application No. PCT/EP2011/052923, filed Feb. 28, 2011, which claims the benefit of the priority of GB Patent Application No. 1003468.4, filed Mar. 2, 2010 under the Paris Convention. Each of these applications is incorporated herein by reference.

FIELD OF THE INVENTION

This invention relates to the manufacture of synthetic silica glass, which may be either pure or doped. In particular, it relates to the manufacture of such glass by controlled combustion of a spray of liquid silica precursor material in the flame of a synthesis burner to give particles (e.g. nanoparticles) of silica, optionally mixed with one or more dopants such as a metal oxide. The particles may be deposited to give a porous soot body for subsequent consolidation to a pore-free glass, or can be deposited at higher temperature to give pore-free glass directly.

More particularly, though not exclusively, the invention relates to the manufacture of high quality synthetic vitreous silica, substantially free from any microbubbles or inclusions, which may be uniformly doped with one or more metal oxides, which oxides may be refractory and difficult to dissolve in silica glass. The method may additionally be used to provide a silica glass doped with non-metallic doping agents, including for example the oxides of boron and phosphorus.

Glass products manufactured according to the invention may be used, for example, as optical materials. In such cases, any dopants may confer useful properties. For example, cerium (optionally with addition of titanium) may be used to introduce a controlled absorption of light at specific wavelengths; alternatively, rare earth metals such as europium, neodymium, samarium, ytterbium, etc. may be utilised to introduce desirable photoluminescence, potential laser activity, etc.

Such glasses may be used in the manufacture of optical fibres or waveguides, both planar and otherwise, or used on a large scale for their optical properties. Doping may be used to give other specific physical attributes. Doping with the oxides of certain rare-earth metals, for example yttrium, with or without a second metal such as aluminium as a co-dopant, may confer resistance to etching by fluorine-containing gases in plasma etch processes during semiconductor manufacture. Doping with titanium, optionally in the presence of other metal species, can be used to make glass of low or even zero thermal expansion coefficient. Doping with certain species may be used to increase the viscosity of the glass, etc. This list is not to be considered as comprehensive, and there exists a wide variety of potential applications in the optical, semiconductor and other industries for glasses made by the method of the invention.

BACKGROUND TO THE INVENTION

In recent years it has become commonplace to manufacture synthetic silica glass by vapour deposition processes, wherein the vapour of a silicon compound is fed to a burner, optionally mixed with the vapour of one or more dopant precursors, and converted to oxide nanoparticles in the flame. These particles are then deposited, either as a porous body (known as a soot body) which can be sintered subsequently to pore-free glass, or at higher temperatures to form a glass directly, the so-called direct quartz process.

The requirement for volatile precursors has led to the widespread use of silicon tetrachloride as the major silica precursor, and a variety of metal and non-metal chlorides as precursors for dopants, where doping of the product is required.

However, there are several advantages in using volatile chlorine-free silica precursors in place of silicon tetrachloride, in particular the absence of acidic by-products in the effluent gases. The potential use of alkoxides was recognised in some of the earliest work on synthetic silica (e.g. U.S. Pat. No. 2,272,342), but more recently the siloxanes have been used as combustible chlorine-free precursors with very high silicon content, notably hexamethyldisiloxane (HMDS), octamethylcyclotetrasiloxane (OMCTS, also known as D4), and decamethylcyclotetrasiloxane (DMCPS, or D5), see e.g. EP 0,463,045 and U.S. Pat. No. 5,043,002 (U.S. Pat. No. RE 39,535).

While vapour feed of the precursors is now regarded as conventional, there are a number of examples where the synthesis flame has been generated, not by feeding the precursors as vapour, but rather by feeding one or more of the precursors as an atomised spray of liquid droplets, which vaporise in the flame, and are then converted by oxidation or hydrolysis to silica nanoparticles.

Thus, the manufacture of pure and doped silica by deposition of a porous deposit from a spray of precursors into a flame was proposed in JP 54-142317, JP 55-95638, and JP 56-14438. A variety of oxy-hydrogen burner configurations was proposed in JP 55-95638. In most of these a liquid, which could be a mixture of a silica precursor and dopant precursors, was atomised by gas-blast (pneumatic or Venturi) atomiser into an oxy-hydrogen flame, and the products were collected as a porous soot body to be sintered to glass. Precursors of silica included tetraethoxysilane (TEOS), and tetramethoxysilane (TMOS), and dopant precursors included $PO(OC_2H_5)_3$ and $B(OC_2H_5)_3$. It was further suggested that metallic dopants could be introduced as separate sprays of aqueous or alcoholic solutions, and thus used to control the refractive index of the product glasses to make optical fibre preforms. Other applications envisaged included glass ceramics, and laser-active glass compositions.

The ability to feed a dopant species as an aqueous solution, rather than as a costly or unstable organometallic species, would permit significant cost reduction, but the quality of glass which would result from feeding two separate sprays into a flame must be open to question.

The atomisation approach was further developed in JP 56-14438, in which increased deposition rates were said to be possible if the pneumatic atomisation of the liquid precursor was replaced by the use of an ultrasonic atomising horn, or alternatively if pneumatic atomisation and ultrasonic atomisation were used in combination. A soot deposition rate of 400 g/h was reported, but the effectiveness of converting a spray comprising separate droplets of silica precursor and dopant is again questionable, and there are no indications of the quality of glass produced by this method.

Spray combustion for generating pure and doped silica glasses has been pursued by other workers. JP 60-96591 describes feeding a pneumatically generated spray of tetraethoxysilane (TEOS), or tetramethoxysilane (TMOS) into the centre of a co-annular oxy-hydrogen flame to provide a porous deposit of pure silica which could be sintered to glass. More recently, U.S. Pat. No. 5,110,335 proposed ultrasonic atomisation using $SiCl_4$ or TEOS as precursor liquids, and combustion in an oxy-methane flame. Spray combustion of chlorine-free siloxane precursors has also been described in a number of patents, for the manufacture of both pure and doped synthetic silica glasses (e.g. EP 0,868,401, U.S. Pat. No. 6,260,385, U.S. Pat. No. 6,588,230, U.S. Pat. No. 6,374, 642, U.S. Pat. No. 6,739,156 and U.S. Pat. No. 6,837,076).

It is notable that despite the number of patents in the literature which describe deposition of synthetic silica from a flame fed with a spray of liquid precursors, the majority of synthetic vitreous silica manufactured to date is still being made by combustion of precursors fed in the form of vapour. This is despite the advantages which might appear to result from a move to spray feed of a liquid precursor. For spray combustion, all that might appear to be required is the provision of a liquid storage and handling system, a metering pump, and the requisite gas supplies with appropriate flow controllers, together with a suitable burner, or array of such burners. For vapour feed, there is the additional need to provide suitable heated vaporisers for silica and dopant precursors, and appropriate heated lines for the supply of vapours to the burner, all to be equipped with appropriate temperature monitoring and control facilities. However, the manufacture of high quality glass by spray combustion is not without problems.

In U.S. Pat. No. 6,260,385 (column 2 line 61-column 3 line 8) it is noted that simple atomisation burners based on pneumatic (air-blast) atomisation may give unsatisfactory soot bodies with wart-like growth, unless the atomising gas is supplied at high velocity. This facilitates atomisation to smaller droplets and reduces the risk of incomplete vaporisation and combustion before the droplets strike the substrate, but the increased flame turbulence has the disadvantage of reducing the soot deposition efficiency, and can give rise to other problems. It was noted in this patent that these problems might be overcome by using ultrasonic atomisation; however this option was dismissed in favour of a so-called effervescent atomisation burner, in which a gas was dissolved under pressure in the precursor liquid, and as the liquid issued from the nozzle it was said to break up into smaller droplets as the dissolved gas formed bubbles in the emerging droplets. However, it appears that it was still necessary to surround the spray with some form of tubular containment (referred to as a "rail"), in order to achieve a satisfactory confinement of the flame for efficient deposition of silica soot. No examples were given of the application of this concept.

Further potential problems arising during spray combustion of siloxanes were discussed in U.S. Pat. No. 6,374,642. Defects in the soot body result if the precursor droplets are too large. They may strike the substrate before they are fully vaporised and then oxidation takes place on the substrate surface. Alternatively, partial vaporisation and oxidation may take place in flight, but then nucleation of silica may occur around the partially vaporised droplets, leading to oversized soot particles. For these reasons, an ultrasonic atomiser was incorporated in the burner, as a means to achieve fine droplet size, without the need for excessive flow of atomising gas. Additionally, the reacting plume from the synthesis burner was surrounded by flames from two or more auxiliary burners, which were intended to ensure complete vaporisation and combustion of the precursor, before reaching the substrate. These additions add greatly to the complexity of the process. Some indications were given regarding possible gas flows and operating distances between burners and substrate, but the quality of the resulting glass is not clear.

Where it is required to produce a doped synthetic silica glass in which the dopant oxide is refractory, i.e. has high melting and/or boiling point, and where it is required to make a glass uniformly doped at an atomic level, and free from bubbles and inclusions, the technique of spraying two liquids together into a flame raises further problems, unless the precursors can be fully vaporised and homogeneously mixed prior to, or in the course of, combustion. Otherwise one or both of the precursors can become converted to a solid or liquid particle whose size will depend on the droplet size in the spray but generally, in the absence of total vaporisation of all the relevant species and homogeneous nucleation and growth of doped glass particles in the flame, this technique cannot be expected to yield a doped glass of the required uniformity on an atomic scale. These points were noted in a recent patent (U.S. Pat. No. 7,624,596), but the practicality of the solution there proposed (supersonic expansion through a Laval nozzle) is unclear, and no examples were given.

One possible reason for the apparent failure of the atomisation approach is the relative difficulty of achieving a uniform spray, of uniform droplet size, in a uniform gas flow, and thus to achieve vaporisation of all droplets, and then controlled combustion in a well-defined region of the flame, as required to generate a high concentration of fully oxidised nanoparticles for collection on the substrate, uncontaminated by any unburnt particles of precursor, or oversized particles of oxide or of other products of pyrolysis of the precursor (e.g. silicon carbide or oxy-carbide) which might lead to defects in the product glass. In the past, these requirements have been achieved more readily in the flame of a synthesis burner fed with all precursor species in the form of vapour.

For deposition of doped silica using two or more precursors, there is the additional problem of ensuring intimate mixing of the constituent species, in constant and repeatable proportions. Where the precursors are available as miscible and chemically compatible liquids, they may be fed as a solution to a suitable atomising nozzle, and the resulting spray led to the soot deposition flame. Thus the manufacture of silica doped with tantalum oxide has been proposed via atomisation of a solution of tantalum butoxide in hexamethyldisiloxane (HMDS), to produce a tantalum-doped silica with increased refractive index (U.S. Pat. No. 6,546,757). The manufacture of silica soots doped with metal oxides, including rare-earth oxides, via spray combustion of organometallic compounds dissolved in siloxanes has also been described in U.S. Pat. No. 6,739,156. Proposed dopant compounds include alkoxides and β-diketonates. Mutual solubility may be enhanced by addition of a solvent (e.g. ethylene glycol monomethyl ether), but this patent notes that problems can occur because of blockage of feed-lines caused by the ready hydrolysis of the proposed organometallic dopant precursors. Possible solutions to these problems were offered but the use of costly organometallic dopant precursors means that this technique is unsatisfactory as an economically viable method of producing the required doped glasses on a large scale.

Furthermore, there are numerous applications for doped vitreous silica products where no suitable organometallic precursors exist, or where the high cost of using such compounds would be unacceptable. These include semiconductor components resistant to plasma etching, optical filters, specialised lamp envelopes, laser-active glasses, etc. While some of these applications have been served in the past by fusing natural quartz crystal powders intimately mixed with appropriate finely divided oxide powders, for certain applications today the methods previously used have proved to be inadequate. Where it is required to have the highest possible purity, combined with complete freedom from internal defects, from microbubbles, from any un-dissolved particles etc., it is desirable that the doped silica glass be manufactured from high purity synthetic feedstocks, and preferable that the glass be highly homogeneous, i.e. uniformly doped at an atomic level.

In the past this has proved to be impossible to achieve on a large scale for many potential metallic dopants at an acceptable cost.

Particular difficulties arise when doping by certain more refractory oxides is required, and significant problems have been found with regard to homogeneous doping of silica with the oxides of certain transition metals, and especially with the oxides of the rare-earth metals. Furthermore, due to the difficulty in getting an ultimate solution of the rare-earth oxides in vitreous silica, because of their relative insolubility or "clustering" of the metal ions in the glass, it has become conventional to co-dope with aluminium oxide to aid the solubility and dispersion of the rare-earth metal ions.

As noted earlier, potentially volatile precursors of the rare-earth metals are either unavailable or very expensive, and are also difficult to handle. Thus it would be more cost-effective and more convenient if it were possible to use a relatively inexpensive salt of the relevant metal, or mixture of metals.

In US 2008/0039310 it was suggested that one precursor (silicon tetrachloride) could be fed as vapour, and a second precursor fed to the flame as a spray. In this case, an atomised spray of a solution of lanthanum and aluminium chlorides in aqueous ethanol was reported to have been fed into the flame of an oxy-hydrogen burner fed with $SiCl_4$ vapour, and deposited as a porous glass on a substrate. This was suggested as a potential alternative to solution-doping of the soot body for the manufacture of such a doped glass. However, it would be difficult thus to ensure that the lanthanum oxide species is generated in the form of ultrafine particles. Unless complete evaporation of all precursor species occurs before conversion to oxide occurs, oxide formation begins in the condensed phase (in this case the dehydrated droplet of solution) and the dopant oxide will not be generated in the form of nanoparticles, as required for atomic level homogeneity in the glass. Furthermore, since the silica particles and dopant oxide particles are generated in two different regions of the flame, this approach is likely to give a soot-body in which the concentration of dopants fluctuates through the layers of soot, and will not give the ultimate homogeneity and/or transparency required in the most critical applications. It may be significant that while optical transmission data were provided in the above patent application for doped glasses prepared by solution doping of a porous body of silica soot, no such figure was given for material prepared by spraying a solution of dopant species into a separate silica synthesis flame.

The potential benefits of providing one or more dopants as an aqueous solution were again noted in U.S. Pat. No. 6,705,127, which proposed the provision of a non-aqueous silica precursor (e.g. a siloxane), optionally containing one or more soluble dopants (e.g. an organometallic compound), together with additional solvent if required, as an aerosol spray via one burner, together with a second spray, which consists of an aqueous solution of further dopants via a second burner. In this arrangement, the silica soot, and such dopants as exist in the second spray, were laid down separately in successive layers, which evidently cannot lead to the desired intimate mixture of components on an atomic scale. In another embodiment, it was envisaged that the non-aqueous and aqueous liquids were fed to a single burner, and thence sprayed into a single flame, but there was no indication as to the burner design in which this could be achieved, or if the technique was effective in providing a homogeneous deposit of acceptable quality.

US 2006/0001952 noted the requirement for the ultimate homogeneity of the glass, even when the dopant may be refractory and prone to form un-dissolved dopant particles or localised concentrations of the dopant oxide (i.e. "clustering"). For this reason it is desirable that, in the course of the combustion synthesis process, both silica and dopant precursor species become fully vaporised, and then condense together as nanoparticles of the mixed oxide particles. This should lead to intimate mixing at an atomic level. It was suggested that this could be achieved using a coaxial oxy-hydrogen burner, in which the central nozzle was fed with a mixture of aluminium, sodium and erbium chlorides in aqueous methanol, and this spray was atomised by a high velocity coaxial flow of hydrogen, itself surrounded by a flow of silicon tetrachloride vapour, and finally by a flow of oxygen. The gas velocities were said to be in the range 0.3 to 1.5 times the velocity of sound, and the high turbulence of the flame was said to give intimate mixing of the components. However, as reported in other patents, such high velocities and turbulence are not generally conducive to efficient collection of soot in the form of a uniform porous body free from defects and well suited to sintering to a defect-free glass, so while the approach may be suitable for deposition of small quantities of doped product, and capable of conversion to a high value optical fibre preform, from which usable material may be selected, it does not appear appropriate for the efficient manufacture of larger quantities of homogeneous defect-free glass.

While the use of salts of dopant species fed as atomised aqueous solutions to the flame has been proposed in the past, the approach is unlikely to lead to total vaporisation of all potential precursor species, especially where these are relatively involatile. Droplets of such solutions might be expected to evaporate to dryness, and then to decompose to solid or liquid particles, but because of the very high boiling point of the dopant oxides of particular interest, some at least of the resulting oxide particles will remain of significant size, and will constitute unacceptable defects in the product glass.

What is required is a method of synthesising the particles of dopant oxide, or oxides, in the flame, such that all the precursors are delivered to the reaction zone as a substantially homogeneous mixture, while ensuring that all the particles of each dopant oxide are either co-condensed from vapour species in the presence of condensing silica particles, or else generated as dispersed nanoparticles of dopant oxide of a size comparable to those which would be achieved by condensation from the vapour, i.e. of sub-micron dimensions.

SUMMARY OF THE INVENTION

The present inventors have devised a new technique which makes it possible to generate particles of both silica and any dopant oxide of sub-micron size, i.e. nanoparticles of dimensions comparable to those of oxide particles grown from a conventional synthesis flame. Moreover, the method has proved suitable for the manufacture of both pure and doped synthetic silica glasses, and uniform incorporation even of refractory and relatively insoluble oxides has proved to be possible, so that homogeneous doping may now be achieved on an atomic scale.

This process is a new variation of the well known method of spray pyrolysis. It is particularly advantageous when used together with a chlorine-free silica precursor which has a large heat of combustion. Possible silica precursors thus include the siloxanes, of which the most important are hexamethyldisiloxane (HMDS), octamethylcyclotetrasiloxane (OMCTS, also known as D4), decamethylcyclopentasiloxane (DMCPS, or D5), and dodecamethylcyclohexasiloxane (DMCHS, or D6). Other chlorine-free organosilicon compounds may also be considered in this type of process, provided they do not suffer unacceptable hydrolysis under the conditions of use, but precursors of particular interest are the siloxanes, particularly the cyclosiloxanes, and most especially D4, D5, and D6, and mixtures thereof. However, other cyclic and linear siloxanes may be used, including homologues, substituted variants, and mixtures thereof.

Aqueous and alcoholic solutions of metal salts are generally immiscible in siloxanes, and, as noted above, the mixing of two separate components, of which one or both may be a spray, has not generally been achieved in the past with ideal homogeneity. However, it has been found possible to create the required ultimately homogeneous dispersion of silica and dopant precursors if the dopant is presented as a solution, for example an aqueous solution, and this solution is provided as an emulsion in the siloxane, i.e. a "water-in-oil" emulsion. This emulsion, in which all components of the ultimate glass may be present in intimate and homogeneous mixture, is then sprayed into the synthesis flame, with each droplet in the aerosol containing all the ingredients necessary to make the ultimate product glass by decomposition, hydrolysis or oxidation in the flame. A uniformly doped silica particle fume may thereby be produced, which is collected as a soot body and subsequently (or simultaneously) sintered to glass.

The synthesis flame is generally provided by a suitably designed combustion burner wherein the oxidation of the precursors is promoted by oxygen, or an alternative oxidising gas, and additional energy may be provided by combustion of appropriate combustible fuel gases, including for example hydrogen, methane, propane, butane, ethylene, acetylene, etc. However, in certain embodiments, it may be advantageous to provide such additional energy by alternative means such as plasma heating. Plasma heating can be provided by known types of plasma heating device, including induction plasma torch, arc plasma torch, and microwave plasma device. Similarly, conventional combustion may be supported by such additional electrical heating means.

The present invention therefore provides, in one aspect, a method of manufacturing a silica-based glass, comprising the steps: forming an emulsion of an aqueous phase in a non-aqueous liquid silica precursor material; supplying said emulsion as a spray of droplets into a synthesis flame, whereby said precursor material is converted in the flame into a silica-containing soot; and collecting said soot on a substrate either as a porous soot body for subsequent consolidation to glass or directly as a substantially pore-free glass.

In particular embodiments, the silica-based glass is a synthetic vitreous silica, which may either by doped or undoped (i.e. substantially pure). The aqueous phase, which constitutes the discontinuous phase of the emulsion, may consist of pure (or substantially pure) water or an appropriate aqueous solution, as described in more detail below. In many embodiments, each droplet in the spray contains all the ingredients required for conversion by oxidation or hydrolysis in the flame to said silica-based glass. For instance, each droplet contains an emulsion of the aqueous phase in the non-aqueous liquid silica precursor material, as well as any (or all) dopants.

Emulsification may be facilitated by addition of one or more emulsifiers. A wide range of surfactants exists and could be considered as emulsifying agents for this application. It may be advantageous to employ two or more surfactants together, in which case these may advantageously be of differing HLB (hydrophile-lipophile balance) value. Thus, surfactants with HLB values in the range 3 to 9 may be found to be suitable, but this range is not regarded to be limiting. Examples of suitable emulsifiers are non-ionic surfactants, free from any metallic impurities, and include silicone-based surfactants such as alkoxylated derivatives of silicone polymers, including co-polymers of polymethyl siloxanes (optionally with alkyl substitution) with polyethers, e.g. polyethylene glycols (PEG), and or polypropylene glycols (PPG). Suitable emulsifiers include Tegopren® 7008, a polyether alkyl polymethyl siloxane (Evonik Degussa GmbH, Rodenbacher Chaussee 4, 63457 Hanau, Germany) and BC99/012 (Basildon Chemical Company Limited, Kimber Road, Abingdon, OX14 1RZ, UK) but many others exist and are available from various manufacturers.

The aqueous phase in the emulsion may comprise an aqueous solution of one or more metal salts, for example a mixture of rare-earth metal and aluminium salts. Emulsification to form micro-droplets of aqueous solution of controlled size in the oil medium may be achieved by standard methods (e.g. high speed blender, high pressure homogeniser, colloid mill, high shear disperser, ultrasonic disruptor, membrane homogeniser, etc.), and may be facilitated by the addition of suitable surfactants, by adjustment of temperature, etc. If the emulsion is sufficiently stable, the homogenisation process can take place in a separate process prior to feeding to the equipment. Alternatively, emulsification can be arranged "in-line" in a vessel upstream of the burner, or it can even occur within a suitably designed burner, such as a burner incorporating an ultrasonic horn, adapted for feeding and atomising two liquids simultaneously (e.g. as available from Sono-Tek Corporation, Milton, N.Y. 12547, USA).

By appropriate techniques, it is possible to ensure that the aqueous micro-droplets within the emulsion of (for example) siloxane are of such a size that each droplet of the atomised spray comprises a siloxane droplet containing many such aqueous micro-droplets, i.e. as a micro-emulsion. Thus, when the emulsion is atomised to oil droplets of size e.g. 20-100 microns, each of these will contain a large number of aqueous micro-droplets of significantly smaller dimensions. Typically, the diameter of the majority of the aqueous micro-droplets is less than 2 microns. It is thought that, on heating in the flame, the water in these aqueous micro-droplets may become super-heated, and then evaporate explosively, and thus help further to diminish the size of the particles of refractory dopant oxide which are formed on evaporation of the water, and subsequent decomposition of the metal salt. It is probable that, at the high temperatures which exist in the flame, extensive vaporisation of the dopant oxide species will occur, and thus the required doped silica will actually be achieved by co-condensation of the constituent oxide species. However, even if the refractory dopant species are never completely vaporised, the micro-droplets of precursor solution are disrupted, evaporated to dryness and then fully oxidised in flight to form sub-micron particles of oxide or mixed oxide. These particles are thus of a size comparable to that achieved by nucleation and growth from the vapour, and are intimately mixed with silica nano-particles generated in the same region of the flame.

The disintegration of the water droplets provides the further advantage that the siloxane droplets are also shattered, thus ensuring better mixing of siloxane and oxygen, more uniform combustion and a more compact combustion zone, which in turn leads to higher potential collection efficiency. This overcomes the previously observed disadvantage of atomisation burners, that the spray may include some oversized droplets which can lead to the arrival of part-oxidised, or oversized particles on the substrate, and their incorporation in the porous body, leading to wart-like growth of the soot body and potential microbubbles in the resultant glass (as described in U.S. Pat. No. 6,260,385).

The new approach may be advantageous for the manufacture of both pure synthetic silica glass and doped synthetic silica glasses, even when the dopant oxide is highly refractory. Thus, when used to make doped silica glass, it is now possible to ensure that the silica particles which ultimately condense from the vapour are actually nucleated and growing on nanoparticles of the refractory dopant oxide. The result is that the doped soot which is deposited and later consolidated yields a homogeneous solution of dopant in the silica glass, at a concentration which is controlled and predictable, unlike the methods proposed earlier.

It is possible to incorporate a wide variety of dopant species in the product glass in this way. Such dopant species may be introduced as water soluble salts of compounds in solution in the aqueous phase of the water-in-oil emulsion. Typically these include the nitrates, chlorides, acetates etc. of metals, or solutions of other compounds of non-metallic elements, such as those of boron, of phosphorus etc.

While the new approach of combustion of an aqueous emulsion in siloxane was developed firstly as a route for the manufacture of doped glasses, it has also been found to provide an improved method of manufacturing a pure synthetic silica glass by feeding an emulsion of pure water in a non-aqueous liquid silicon precursor (e.g. siloxane) as an atomised spray from combustion in a flame.

The addition of ionic species to the aqueous solution has been found to enhance the stability of the emulsion, and to enable the achievement of smaller droplets of solution in the emulsion. This may be beneficial not only in the manufacture of doped silica glasses as above, but potentially also in the manufacture of un-doped glass. Thus it may be beneficial to add appropriate ionic species to the pure water emulsion, suitable species being those which decompose or oxidise in the flame without generating significant impurities in the silica soot to be deposited. Potential additives thus include the mineral acids, e.g. hydrochloric, nitric, and sulphuric acids, etc., carboxylic acids e.g. formic, acetic, propionic acids etc., or organic bases e.g. methylamine, trimethylamine etc., optionally with appropriate counter-ion, e.g. as a solution of the hydrochloride, and decomposable salts, e.g. ammonium chloride, nitrate, sulphate, formate, acetate, etc. The use of ammonium nitrate, or other salts with a high content of combined oxygen is of particular interest, since such species generate significant gas on pyrolysis, and this may be beneficial in facilitating the disintegration of the precursor particles in the aerosol, and in favouring their complete oxidation to ultrafine silica particles, while leaving the silica substantially uncontaminated with any residues of foreign species.

The use of a water-in-oil emulsion, wherein the aqueous phase contains the precursors of dopant species in the form of one or more dissolved salts provides a cost-effective method of preparing in bulk a doped synthetic silica glass of predictable concentration, in which the dopant species are ultimately dispersed on an atomic scale, and free from any particulate inclusions. It overcomes the problems inherent in previous methods which include the high cost and difficulty of handling of organometallic dopant precursors, the risk of microbubbles and inclusions in the glass if the dopant oxide particles are not completely dissolved, and the difficulty of achieving uniform concentration of the dopant in the glass, or even in predicting the average level of dopant in the final glass on the basis of the deposition conditions.

The present method is particularly useful for the preparation of silica glass doped with the oxides of rare-earth metals and other refractory oxide species, but is not limited to these species. Indeed the method may also be used for generating glass products doped with the oxides of any of a wide range of metals, selected from Groups 1 to 16 and the lanthanide (rare-earth) and actinide series of the Periodic Table of the Elements (IUPAC version). It may also be used for the incorporation of certain non-metallic dopants, including for example the oxides of boron and or phosphorus.

If, as may be required for some applications, it is desired to have a gradient in the dopant level in the glass, this can be achieved by progressive variation in the concentration of specific dopant species, present in the emulsion. In some embodiments it may be appropriate to provide one or more dopant species dissolved in the non-aqueous phase, but one of the main advantages of the present method is that it provides a cost-effective method of making a homogeneously doped glass using an aqueous emulsion, containing dissolved dopant precursors in the form of inexpensive salts, in a non-aqueous chlorine-free silica precursor such as a siloxane.

Although, as indicated above, the present method can yield a doped glass in which the dopant species is dispersed substantially homogeneously at an atomic level, for some applications it may be desirable to achieve a level of homogeneity even greater than that achieved in the initially manufactured glass. For example it may be desirable to achieve a more uniform dopant level than first achieved, or it may be necessary to take steps to improve the uniformity of refractive index, thermal expansion coefficient or other property, and this may for example require a more uniform OH level than is obtained in the initially produced glass. Under these circumstances it is possible to improve the overall uniformity of the glass by applying a subsequent homogenisation process, followed by an appropriate annealing operation. Some homogenisation may be achieved by any reflow process of the glass to give a body of alternative shape, particularly of larger cross section. The homogenisation processes described in U.S. Pat. No. 5,443,607 and U.S. Pat. No. 5,790,315, in which the glass body is mixed by twisting, are particularly suitable for the manufacture of optical glass of the highest homogeneity.

While the delivery of dopant species to the flame as a solution in the aqueous phase of the emulsion is regarded as one of the most important applications of this invention, it is envisaged that in some circumstances it may be desirable to deliver certain dopants as a dispersion of ultrafine particles suspended in the aqueous phase, or even as a secondary emulsion, i.e. as an oil-in-water emulsion present as microdroplets suspended in the non-aqueous chlorine-free silica precursor.

An additional feature of the new technique is that the use of an emulsion of water in the siloxane spray alters the combustion characteristics such that the flame generates a reduced level of oxides of nitrogen. This will represent a significant advantage when used on a large scale, under circumstances where NOx emission has to be limited. The invention therefore also provides a method of reducing the NOx emissions from an atomisation burner used in the manufacture of silica-based glass, wherein said atomisation burner is fed with an emulsion of an aqueous phase in a non-aqueous chlorine-free liquid silica precursor, in a silica manufacturing method as described.

BRIEF DESCRIPTION OF THE DRAWINGS

The invention is hereinafter described in more detail by way of example only, with reference to the following experimental details and the accompanying drawings, in which.

DETAILED DESCRIPTION OF EXAMPLES

Experiments have been undertaken using a range of emulsions of water or aqueous solutions in individual siloxanes, or in mixtures. A convenient mixture with approximate composition 77% D4, 21% D5, 2% D6 is supplied as "D4N", (Momentive Performance Materials, 22 Corporate Woods Boulevard, Albany, N.Y. 12211, USA). This mixture has been used in trials since it is not subject to freezing at room temperature, but evidently pure siloxanes may be alternatively be used in this process.

Typical emulsions are described below.

Figure 1:
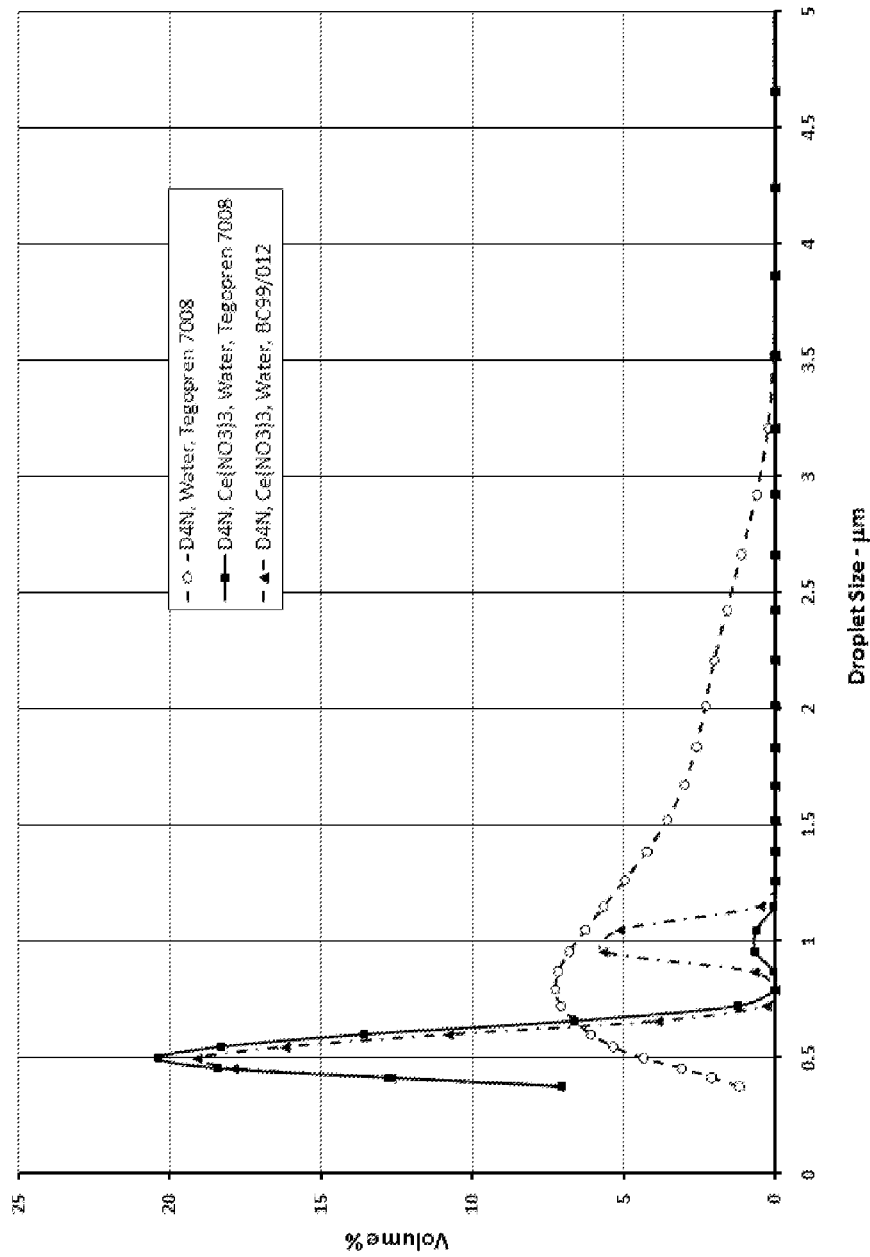
FIG. 1 is a graph illustrating droplet size distribution in emulsions of water, and of cerium nitrate solutions, in D4N mixed siloxane with two alternative emulsifiers.

Emulsion 1. A typical emulsion has been made as follows. To 920 ml of D4N were added 30 ml of the emulsifier Tegopren® 7008. 50 ml of water was then added to the non-aqueous phase, and the mixture was initially emulsified using a high-speed homogeniser (Ultra-Turrax, Model No. T25, IKA-Werke GmbH & Co. KG, Janke & Kunkel-Str. 10, 79219 Staufen, Germany). Emulsification was completed by vigorous agitation of the vessel in an ultrasonic bath. The size distribution of the droplets of the aqueous phase in the resulting emulsion was measured by a laser diffraction particle analyser, Model LS230 (Beckman-Coulter UK Inc., High Wycombe, HP11 1JU, UK), and this distribution is shown in FIG. 1. The diameter of the micro-droplets of the aqueous phase is generally less than 3.5 µm, and the majority of such micro-droplets droplets are less than 2 µm in diameter.

Emulsion 2. An aqueous solution of cerium (III) nitrate (8 g) in deionised water (50 ml), was added to 920 ml of D4N containing 30 ml of Tegopren® 7008. The mixture was emulsified as before, and the droplet size distribution was measured as previously, yielding the results shown in FIG. 1. The diameter of the great majority of the aqueous micro-droplets is evidently less than 1 µm.

Emulsion 3. An aqueous solution of cerium (III) nitrate (40 g) in deionised water (50 ml), was added to 920 ml of D4N containing 30 ml of BC99/012. The mixture was emulsified as before, and the droplet size distribution was measured as previously, yielding the results shown in FIG. 1. Despite the high concentration of dissolved salt, the aqueous droplets are all of diameter less than 1.5 µm.

Figure 2:
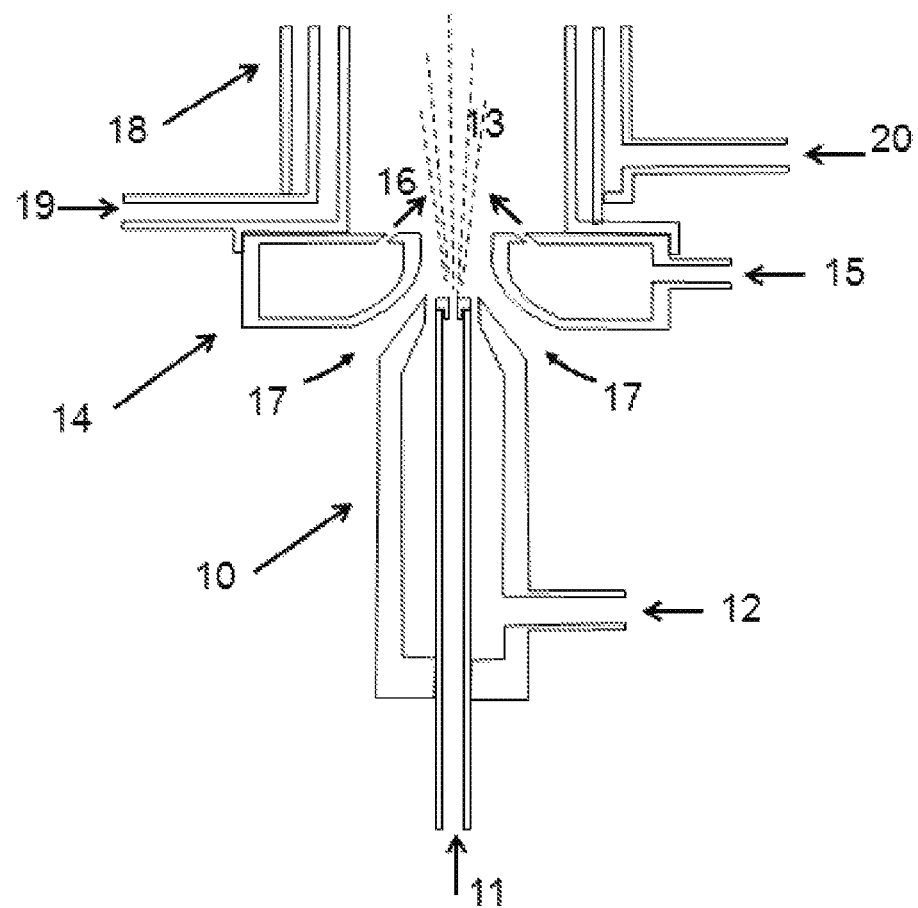
FIG. 2 is a diagrammatic sectional view of an embodiment of synthesis burner suitable for use in methods according to the invention.

Emulsions such as these may be fed to an atomisation burner, a simple example of which is shown schematically in FIG. 2. The burner assembly may be made up from three components, an atomisation nozzle, a pilot burner, and an auxiliary burner.

The spray is provided by a simple stainless steel atomisation nozzle 10 (Model No. AL/06, Delavan Ltd., Widnes, WA8 0RJ, U.K.), which may be fed via a pulse-free metering pump (not shown) with a flow of liquid mixed siloxane (or a selected water-in-oil emulsion), 11, and atomised with a flow of atomising gas 12, for example oxygen. This results in a spray of fine droplets, 13. Typical mean droplet sizes for sprays from such a nozzle under the present conditions of use lie in the range 20-100 µm. Thus, when operated with a water-in-oil emulsion, it can be assumed that each droplet in the spray will contain a multiplicity of micro-droplets of the aqueous phase, and will thus incorporate all the ingredients of the eventual pure or doped silica soot, requiring only reaction with oxygen to generate soot particles of substantially uniform composition.

Nozzle 10 may be mounted beneath stainless steel pilot burner 14, which incorporates a ring of 1 mm diameter orifices 16, emerging on a circle of radius 11 mm, and inclined toward the principal axis of the burner. Fed with hydrogen 15, this provides an array of pilot flames 16, stabilising combustion of the siloxane spray. A flow of ambient air 17 is induced by the atomiser spray, and helps to keep the face of the atomiser nozzle free from deposits of silica. In an alternative version of this burner, nozzle 10 and pilot burner 14 can be joined hermetically, and arrangements can then be made to provide a controlled flow of a selected gas in the annular gap shown at 17.

The total input power of the burner may be conveniently adjusted using auxiliary burner 18, which can be in the form of a coaxial burner made from fused quartz, fed with oxygen via port 19 and hydrogen via port 20.

Such a burner may be used to convert aqueous emulsions in siloxanes to pure and doped silica soots, subsequently sintered to pure and doped silica glasses. By adjustments to the flows of liquid and gases, and the dimensions of annular gap 17, as well as the distance separating the burner and substrate (not shown), it is possible to optimise the deposition efficiency, for a given soot density. It has been found that under some circumstances there is a limitation to the deposition efficiency, beyond which higher deposition efficiency leads to nodular growth of the soot which, on sintering, yields glass containing unacceptable defects. It is believed that this effect is due to the incorporation in the soot body, not of ultrafine oxide particles, but of oversized and incompletely oxidised particles. High speed photographs of the periphery of the flame during operation when nodule formation is occurring have revealed tracks, believed to correspond to such oversized particles. These may give rise to inclusions or regions of micro-bubble in the glass when it is sintered, and such defects may be unacceptable in the product.

In comparative experiments it is possible to demonstrate deposition conditions which lead to nodular growth of soot when the burner is fed with the above mixed siloxane e.g. at a rate of 0.72 liters per hour, and atomised in oxygen (0.70 sm$^3$/h (i.e. standard cubic meters per hour)), and with hydrogen flow to pilot jets at 0.73 sm$^3$/h, and flows to auxiliary burner of $O_2$ at 2.10 sm$^3$/h and of $H_2$ at 1.75 sm$^3$/h. When the burner is fed with a similar flow of Emulsion 1 above under otherwise similar conditions, acceptable soot deposition without nodules can be achieved, and the resulting pure silica soot body may be sintered to glass free from bubbles and inclusions by heating under vacuum at a temperature of 1,500° C. for 1 hour. If required, it could be subjected to a dehydration and purification process by heating in an atmosphere containing (for example) chlorine, prior to sintering. Sintering in hydrogen or helium would also be possible.

The addition of an appropriate emulsifier is beneficial in aiding the achievement of a stable water-in-oil emulsion in which the aqueous droplets are of small size, and this size distribution may be maintained over many hours, or longer. However, in some circumstances it is possible to operate with an emulsion which is free from added emulsifier. Such an emulsion is likely to be less stable but may still be used in the present process. For example, when feeding separately a siloxane without added emulsifier and an aqueous phase to a burner which incorporates an ultrasonic atomising horn, the two components are caused to merge under the influence of the ultrasonic oscillation at the face of the horn. An emulsion of aqueous micro-droplets is thereby formed within each siloxane droplet, which can be fed to the flame and caused to react to form the appropriate pure or doped silica soot. The presence of an added emulsifier is thus not an essential feature of the present invention.

It is also possible to achieve acceptable soot deposition using an emulsion of an aqueous solution of dopant salts in the siloxane precursor, for example the stable Emulsions 2 or 3 above, and in this way to achieve a uniformly doped soot body, which can be sintered to a glass homogeneously doped on an atomic scale, and free from bubbles and inclusions.

The above experiments show the viability of the method of the invention, and that it is possible to achieve both pure and doped synthetic silica glasses by combustion of an emulsion of water, or an emulsion of an aqueous solution of one or more metal salts, in a non-aqueous (e.g. siloxane) precursor, and collection of the product as a porous body suitable for subsequent sintering to glass. It is to be expected that with an appropriate burner, and by raising the temperature of the substrate, it will be possible of the soot particles to sinter directly to a pore-free doped silica glass.

While these experiments may be done with the simplest of burners, it is evident that more sophisticated burners can be used to generate a spray of emulsion and feed this to the synthesis flame, and that various methods of atomisation are possible. For example, the emulsion may be atomised by pneumatic means (e.g. a flow of atomising gas) or ultrasonic means (e.g. by use of an ultrasonic horn). In certain embodiments it is possible to achieve in situ emulsification of the liquid feeds, for example by feeding the component liquids to an ultrasonic horn, adapted to handle two liquid feeds, optionally mounted within the burner. Alternative burners may include coaxial burners employing hydrogen, natural gas, propane etc. as fuel, or may employ premixed gases fed for example as jets into the flame. Inert gases such as nitrogen or argon may be employed as alternative atomisation gases, or as gases separating reactive gases to aid cooling of the burner components, or to avoid build-up of deposits on the face of the burner etc., and may also be used as diluent gases in any of the reactive gas streams if required. Oxygen is obviously the most convenient oxidising gas, though others (e.g. air, ozone, oxides of nitrogen etc.) are possible in principle.

It is thus clear that, when using a single non-aqueous precursor (e.g. a siloxane) or mixture of such precursors as an aerosol spray fed to a silica synthesis burner, the addition of pure water or an aqueous solution of an appropriate ionic species as an emulsion in the non-aqueous precursor can improve the efficiency of combustion of the precursor and thus improve the potential collection efficiency and the quality of a pure silica glass product generated. It is possible, furthermore, that by replacing pure water with an aqueous solution of one or more metal compounds, or even a colloidal suspension in water of such compounds, one can deposit a homogeneously doped silica soot, and thus to achieve a homogeneously doped glass, free from bubbles and inclusions.

The invention claimed is:

1. A method of manufacturing a silica-based glass, comprising the steps:
   forming an emulsion of an aqueous phase in a non-aqueous liquid silica precursor material;
   supplying said emulsion as a spray of droplets into a synthesis flame, whereby said precursor material is converted in the flame into a silica-containing soot; and
   collecting said soot on a substrate either as a porous soot body for subsequent consolidation to glass or directly as a substantially pore-free glass,
   wherein the aqueous phase comprises a solution of at least one salt of at least one metallic dopant species.

2. A method according to claim 1, wherein said synthesis flame is provided by a synthesis burner.

3. A method according to claim 1, wherein said synthesis flame is provided by a plasma heating device.

4. A method according to claim 1, wherein said silica precursor material is a non-aqueous chlorine-free silicon compound.

5. A method according to claim 4, wherein the non-aqueous chlorine-free silicon compound is selected from the group consisting of a siloxane compound and a mixture of siloxane compounds.

6. A method according to claim 5, wherein said siloxane compound is selected from the group consisting of hexamethyldisiloxane, octamethylcyclotetrasiloxane, decamethylcyclopentasiloxane, dodecamethylcyclohexasiloxane and mixtures of at least two thereof.

7. A method according to claim 1, wherein the non-aqueous phase of the emulsion further includes an emulsifier.

8. A method according to claim 7, wherein the emulsifier is a silicone-based surfactant.

9. A method according to claim 1, wherein said metallic dopant species includes at least one compound capable of conversion in said synthesis flame to the oxide of at least one metal selected from Groups 1 to 16 and the lanthanide and actinide series of the Periodic Table of the Elements.

10. A method according to claim 1, wherein at least one non-metallic dopant species is incorporated into the glass.

11. A method according to claim 10, wherein such non-metallic species includes an oxide of an element selected from boron and phosphorus.

12. A method according to claim 1, wherein each droplet in the spray contains all of the ingredients required for conversion by oxidation or hydrolysis in the flame to said silica-based glass.

13. A method according to claim 12, wherein each droplet in the spray contains an emulsion of said aqueous phase in said non-aqueous liquid silica precursor material.

14. A method according to claim 13, wherein the diameter of the majority of micro-droplets of said aqueous phase in said emulsion is less than 2 μm.

15. A method according to claim 1, wherein each droplet in the spray contains the at least one dopant species.

16. A method according to claim 2, wherein the emulsion is atomised within the synthesis burner by pneumatic means.

17. A method according to claim 16, wherein the pneumatic means comprises a flow of atomising gas.

18. A method according to claim 2, wherein the emulsion is atomised within the synthesis burner by ultrasonic means.

19. A method according to claim 18, wherein the ultrasonic means comprises an ultrasonic horn.

20. A method according to claim 2, wherein emulsification takes place within or proximate to the burner, and is facilitated by an ultrasonic horn adapted for the simultaneous feeding and emulsification of two liquid phases.

21. A method according to claim 1, wherein said silica-based glass is subjected to a subsequent homogenisation process.

22. A method of reducing the NOx emissions from an atomisation burner used in the manufacture of silica-based glass, wherein said atomisation burner is fed with an emulsion of an aqueous phase in a non-aqueous chlorine-free liquid silica precursor, in a method according to claim 1.

23. A method according to claim 1, wherein said synthesis flame is augmented by a plasma heating device.

* * * * *